US007996907B2

(12) United States Patent
Kakinuma et al.

(10) Patent No.: US 7,996,907 B2
(45) Date of Patent: Aug. 9, 2011

(54) DATA RECORDING METHOD, DATA RECORDING SYSTEM, DATA RECORDING APPARATUS, DATA READING METHOD, DATA READING SYSTEM, COUNTING METHOD, COUNTING SYSTEM, METHOD OF SUPPLYING ENCRYPTION KEY, SYSTEM FOR SUPPLYING ENCRYPTION KEY AND PROGRAM

(75) Inventors: Kaoru Kakinuma, Kanagawa-ken (JP); Kazuki Matsumoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 2184 days.

(21) Appl. No.: 10/368,979

(22) Filed: Feb. 18, 2003

(65) Prior Publication Data

US 2004/0161112 A1    Aug. 19, 2004

(51) Int. Cl.
G06F 17/30     (2006.01)
G06F 12/14     (2006.01)

(52) U.S. Cl. ......................................... 726/26; 713/193
(58) Field of Classification Search .................... 713/193
See application file for complete search history.

(56) References Cited

U.S. PATENT DOCUMENTS

| | | | | |
|---|---|---|---|---|
| 5,703,951 A * | 12/1997 | Dolphin | ............................ | 705/51 |
| 5,991,399 A * | 11/1999 | Graunke et al. | .............. | 380/279 |
| 6,385,596 B1 * | 5/2002 | Wiser et al. | ...................... | 705/51 |
| 6,886,098 B1 * | 4/2005 | Benaloh | .......................... | 713/193 |
| 7,062,045 B2 * | 6/2006 | Riddick et al. | ................... | 380/44 |
| 7,088,823 B2 * | 8/2006 | Fetkovich | ..................... | 380/255 |
| 2001/0049792 A1 * | 12/2001 | Terasaka et al. | .............. | 713/193 |
| 2002/0001388 A1 * | 1/2002 | Ko et al. | ......................... | 380/282 |
| 2002/0016910 A1 * | 2/2002 | Wright et al. | .................. | 713/150 |
| 2002/0021806 A1 * | 2/2002 | Nara et al. | ...................... | 380/201 |
| 2002/0106192 A1 * | 8/2002 | Sako | ............................... | 386/94 |
| 2003/0120926 A1 * | 6/2003 | Fukushima et al. | ........... | 713/176 |
| 2003/0177422 A1 * | 9/2003 | Tararoukhine et al. | .......... | 714/48 |

FOREIGN PATENT DOCUMENTS

| | | |
|---|---|---|
| JP | 08339628 A2 | 12/1996 |
| JP | H10-020956 | 1/1998 |
| JP | H10-133955 | 5/1998 |
| JP | H10-260902 | 9/1998 |
| JP | 2000-029682 | 1/2000 |
| JP | 2000-295208 | 10/2000 |
| JP | 2001-147970 | 5/2001 |
| JP | 2001217822 A2 | 8/2001 |
| JP | 2001266480 A | 9/2001 |
| JP | 2001-273133 | 10/2001 |
| JP | 2002026896 A2 | 1/2002 |
| JP | 2002-116837 | 4/2002 |

OTHER PUBLICATIONS

Review Cypherus Version 2.0, http://www.ucs.org/mag/archive/aug01.htm, Aug. 2001, Blue Chips Magazine.*

* cited by examiner

*Primary Examiner* — Kambiz Zand
*Assistant Examiner* — William S Powers
(74) *Attorney, Agent, or Firm* — Dillon & Yudell LLP (57) ABSTRACT

Data recorded in a recording medium is encrypted with an encryption/decryption key, and the encryption/decryption key is encrypted with an encryption-only key. The encrypted encryption/decryption key is embedded in encrypted data. A decryption-only key the encryption/decryption key is embedded in a program for reading. The data and the program for reading are recorded in the recording medium. The data cannot be read without the program for reading. The program for reading cannot be used for recording other data even if it is copied.

8 Claims, 7 Drawing Sheets

DATA RECORDING METHOD, DATA RECORDING SYSTEM, DATA RECORDING APPARATUS, DATA READING METHOD, DATA READING SYSTEM, COUNTING METHOD, COUNTING SYSTEM, METHOD OF SUPPLYING ENCRYPTION KEY, SYSTEM FOR SUPPLYING ENCRYPTION KEY AND PROGRAM

FIELD OF THE INVENTION

The present invention relates to a technique for recording data in a recording medium. For example, the invention can be used for recording data which must be preserved for a long time and which is created using a special application program in a recording medium.

BACKGROUND ART

There are increasing needs for preserving data, such as books, as electronic data. The reason is the fact that it has become possible to preserve national tax-related books and documents as electronic data in addition to preserving them on paper.

Books and documents concerning national taxes must be preserved for a long time that is several years and more. Further, many requirements must be satisfied to preserve books and documents concerning national taxes as electronic data because of the nature of them. Referring to some of the requirements, (1) it must be possible to display the data on a display or print out it as occasions demand; (2) the data must be recorded such that a history of corrections, additions and deletions made to the same can be checked; (3) it must be possible to retrieve the data using keywords such account entries and types of leases, and (4) there must be a function of extracting and listing data on a particular item that further satisfies certain requirements (e.g., a function of extracting data on slips for a particular customer).

Recent software products have a short life cycle, and new programs and upgraded versions of programs are being introduced to the market one after another. Therefore, there is a concern about situations in which data cannot be read immediately because the program used for writing the data in a recording medium is unavailable when the data is to be read (because it is not installed in the terminal used, for example). One method for solving this problem is to preserve data to be preserved and a program for reading the data in combination in the same recording medium (a CD-ROM, for example). According to this method, the data can be read later at even a terminal in which the program for reading the data is not installed.

However, the above-described method in which data to be preserved and a program for reading the data are preserved in combination with each other in the same recording medium has a problem in that the stored program can be easily copied and used on an illegal basis. For example, it is easy to copy the contents of a recording medium in which data and a program for reading the data from the recording medium are recorded, to read the data using the program for reading recorded along with the data thereafter, to rewrite the contents of the data to contents that are to be newly recorded, and to record the contents in a different recording medium along with the copied program. This operation can be repeated.

This results in problems when costs required for the development and sale of the program, technical supports for the same, and so on are to be collected as a selling price of the system or program or a license fee for the use of the same. In particular, when a read program having special functions is recorded in a recording medium along with data similarly to preservation of data, it is very much problematic that the software can be copied and used on an illegal basis. The reason is that a great cost is required for the development of such a read program because it must have special functions, as described above. While such a program is not distributed in the market in a large quantity, long term technical supports by the manufacturer are desired for the program because data must be reliably read when needed. However, the fact that the program can be easily copied and used on an illegal basis makes it difficult to recover development costs and costs required for technical supports.

One method for recovering development costs for a program is to set a high selling price or license fee in exchange for allowing the program to be copied. However, this method is not preferable, not only for users but also for sellers, because it can prevent the market scale from expanding. Above all, it is not preferable to allow a situation in which some users bear a high cost in purchasing a program or getting a license on the same in the presence of users who are free to use it on an illegal basis.

Under the circumstances described above, there is a need for a measure to prevent a program for reading data to be preserved from being easily used on an illegal basis even when the data to be preserved and the program for reading the data are recorded in the same recording medium.

The present invention provides a technique for preserving data to be preserved and a program for reading the data in the same recording medium, the technique preventing the program required for reading the data to be preserved from being copied on an illegal basis.

There is also a need for a measure to charge for the use of a program for reading data when the reading program is recorded in a recording medium along with the data. Since a recording medium in which a reading program is recorded along with data to be preserved may be freely transferred or handed over, the person or computer (is considered to be licensed at the purchase of software) that has created the recording medium is not necessarily identical to a person or computer that utilizes the program recording in the medium later. Therefore, charging for each act of creating or using the recording medium is in line with the idea of granting a license to use the program recorded in a recording medium. Further, it is preferable for a developer to have various methods to recover development costs, and this may be also advantageous for users in that an initial cost for purchasing is reduced.

The present invention also provides a method of separately charging for the use of a method of preserving data to be preserved and a program for reading the same in the same recording medium.

SUMMARY OF THE INVENTION

The present invention can be summarized as follows. The invention is a data recording method including the steps of encrypting data, embedding a decryption-only key required for decrypting the data in a program for reading the data, and recording the encrypted data and the program in a recording medium.

According to the present invention, since the data and a program for reading the same are recorded in a recording medium, the data can be read without installing the program for reading in hardware (e.g., a personal computer) to read the data from the recording medium. This is advantageous in that no separate program for reading is required to preserve data for a long time or to preserve data created using a program of special specifications.

Further, according to the present invention, since a decryption-only key required for decrypting data is embedded in a program for reading recorded along with the data in a recording medium, decryption can be performed in a normal method only with a particular combination of the data and the program for reading the same. Therefore, even if the reading program is used by copying that program on an illegal basis, it is difficult to read data other than the particular combination from the recording medium. As a result, illegal copying of the program for reading is suppressed.

Since a decryption-only key required for decrypting data is embedded in a program, it is difficult to find a encryption-only key required for encrypting data even if the contents of a recording medium is copied. Therefore, even if the contents of a recording medium are copied, it is difficult to record the data in another recording medium again using the program for reading thus copied. Thus, illegal copying and use of the program for reading is suppressed.

According to the present invention, the step of encrypting data preferably includes the steps of encrypting the data with a key used for both of encryption and decryption, and encrypting a key that has encrypted the data with a encryption-only key that is paired with the decryption-only key, the method preferably further includes the step of embedding the encrypted key in the data. In this case, a process of encrypting data can be performed quickly because a key for both encryption and decryption is used.

The present invention preferably further includes the step of discarding the encryption-only key. In this case, since the encryption-only key used to encrypt data is discarded when a process of temporarily writing data in a recording medium is completed, it can not be acquired without a decrypting technique. Since this makes it difficult to obtain the key for encryption even if the program for reading data is copied on an illegal basis, it is difficult to record new data in the recording medium, which strongly suppresses illegal use of the same.

The present invention preferably further includes the step of recording a history of recording of data in a recording medium. In this case, an act of recording data and a program for reading in a recording medium can be charged based on such a history of recording.

The present invention provides a counting method carried out on a terminal in which a data recording method is executed including the steps of encrypting data, embedding a decryption-only key required for decrypting the data in a program for reading the data from a recording medium, and recording the encrypted data and the program in a recording medium, the counting method comprising the step of checking a history of recording of the data in the recording medium through a network.

According to the present invention, a history of recording of data and a program for reading on a recording medium is recognized through the Internet, which allows an act of recording the data and the program for reading the same in the recording medium to be charged.

The present invention may be understood as a system or program. It can be understood as a system having a unit for performing each step or a program that cause a computer to read and execute a procedure associated with each step.

PREFERRED EMBODIMENT OF THE INVENTION

The preferred embodiment of the invention will now be described with reference to the drawings. The invention may be carried out in a wide variety of modes, and the disclosure of the present embodiment should not be taken in a limiting sense. Like components are indicated by like reference numerals throughout the embodiment.

The present embodiment will be described with reference to an example in which a CD-RW is used as a recording medium and in which data appropriate for a CD-RW is recorded along with a program for reading the data. While there is no particular limit on data to be recorded, it may be data associated tax, for example.

Figure 1:
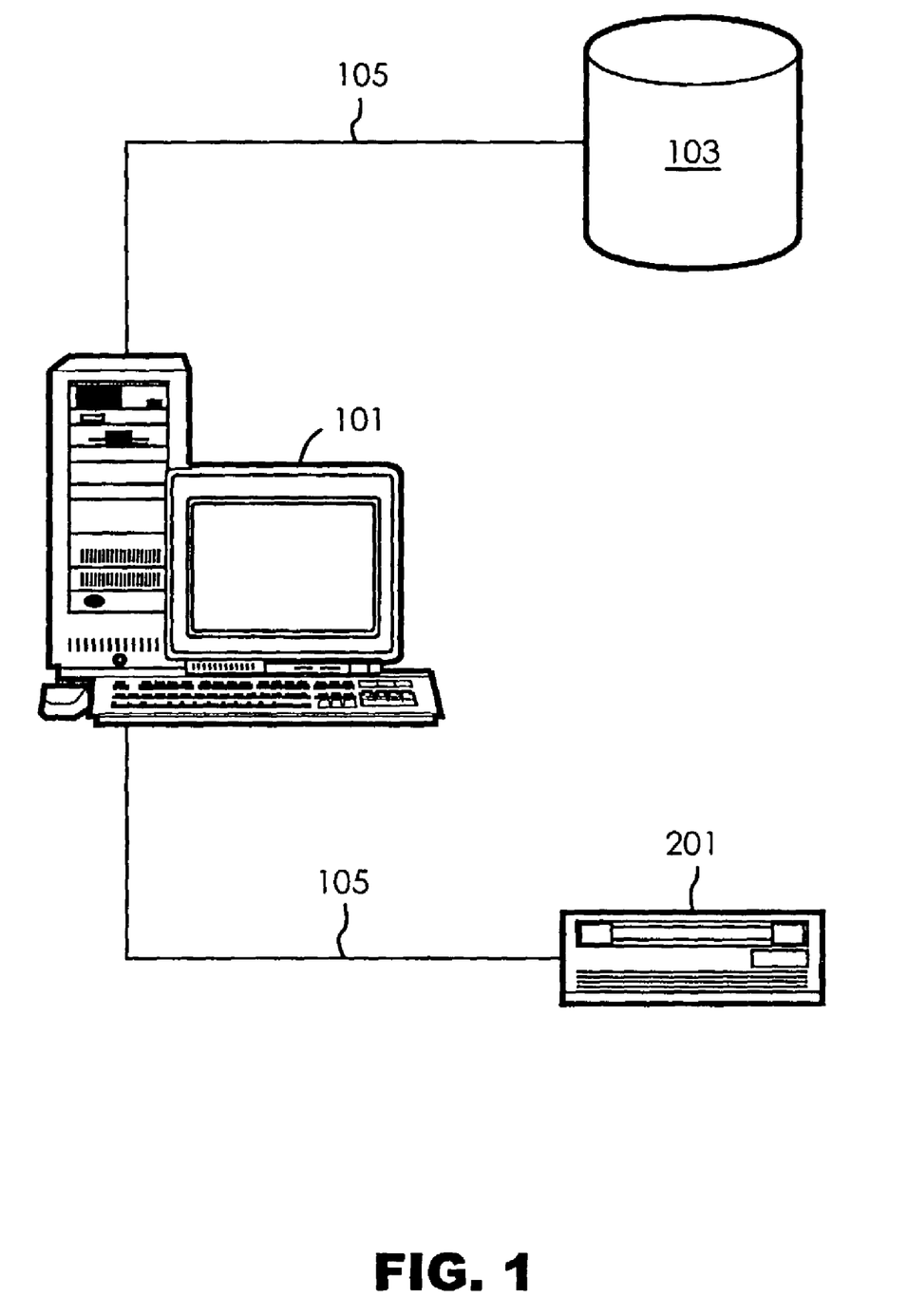
FIG. 1 illustrates an example of a system in which a data recording method according to the invention can be carried out.

FIG. 1 illustrates an example of a system in which a data recording method according to the invention can be carried out. The system shown in FIG. 1 includes a computer 101, an internet server 102, a database 103, a CD-RW drive 201, and a LAN 105 that connects those apparatus. CD-RW stands for "compact disk-rewritable". LAN stands for "local area network".

The computer 101 is a terminal used by a user, and it is a dedicated machine or general-purpose personal computer that can process various data. The database 103 is an external storage in which data to be processed by the computer 101 is recorded. The database 103 may be a database server or an external hard disk apparatus. Programs for executing procedures of a data recording method to be described later are installed in the computer 101. The programs include a program for reading data recorded in a CD-RW.

The CD-RW drive 201 is an apparatus for recording data processed by the computer 101 in a CD-RW that is a recording medium. The CD-RW drive 201 also has a function of reading data from a CD-RW and correcting and erasing data recorded in a CD-RW.

A CD-RW is a recording medium that accepts writing of data compatible with specifications for CD-ROMs (compact disk read only memories) that only allows data to be read therefrom. Data is written in a CD-RW utilizing changes in reflectivity resulting from changes in a crystal structure that occur when it is irradiated with laser light. Data recorded in a CD-RW can be read with a general-purpose CD-ROM drive if compatibility is achieved between them.

The LAN 105 connects those apparatus, and Ethernet® or a token ring is used, for example. A wired or wireless configuration is used as data transmission unit that constitutes the LAN 105 and, alternatively both of such configurations may be properly used. A computer, printer, and database may be connected to the LAN 105 in addition to the apparatus shown in FIG. 1. "Ethernet® is a trademark or registered trademark of XEROX Corporation used in the United States and other countries.

Figure 2:
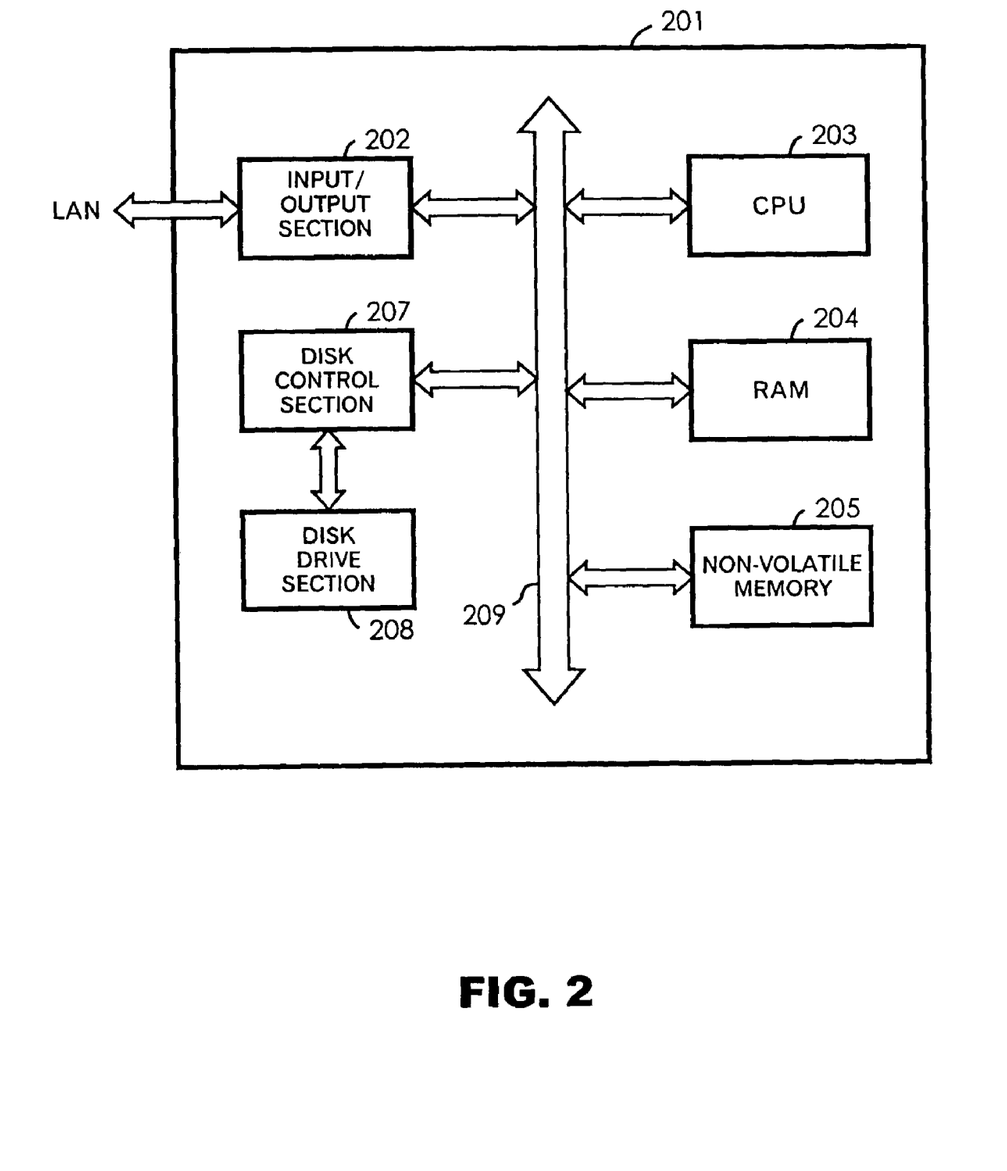
FIG. 2 is a diagram schematically showing a CD-RW drive that is an example of a data recording apparatus in which the data recording method according to the invention can be carried out.

FIG. 2 is a diagram schematically showing a CD-RW drive that is an example of a data recording apparatus in which a data recording method according to the invention can be carried out. The CD-RW drive 201 includes an input/output section 202, a CPU 203, a RAM 204, a non-volatile memory 205, a disk control section 207, a disk drive section 208, and bus wiring 209.

The input/output section 202 has a function of receiving data sent through the LAN 105 and a function of transmitting data to the LAN 105. The CPU 203 has a function of supervising and controlling each of the devices included in the CD-RW drive 201. The RAM 204 has a function of temporarily recording information required during the operation of the CD-RW drive 201. A program required for the operation of the CD-RW drive 201 is recorded in the non-volatile memory 205. The number of pairs of encrypting keys and decrypting keys generated as described later and a history of recording of data in a CD-RW disk are recorded in the non-volatile memory 205. The number of times a data writing method described in the present embodiment is used is understood from such a history, and the user is charged for a license fee accordingly. In the non-volatile memory 205, a key is recorded which allows execution of a program for executing procedures of a data recording method to be described later installed in the computer 101.

The disk control section 207 is a device for controlling the disk drive section 208. The disk drive section 208 has a mechanism for loading a CD-RW, a mechanism for driving a CD-RW, and a mechanism for writing and reading data in and from a CD-RW.

Figure 3:
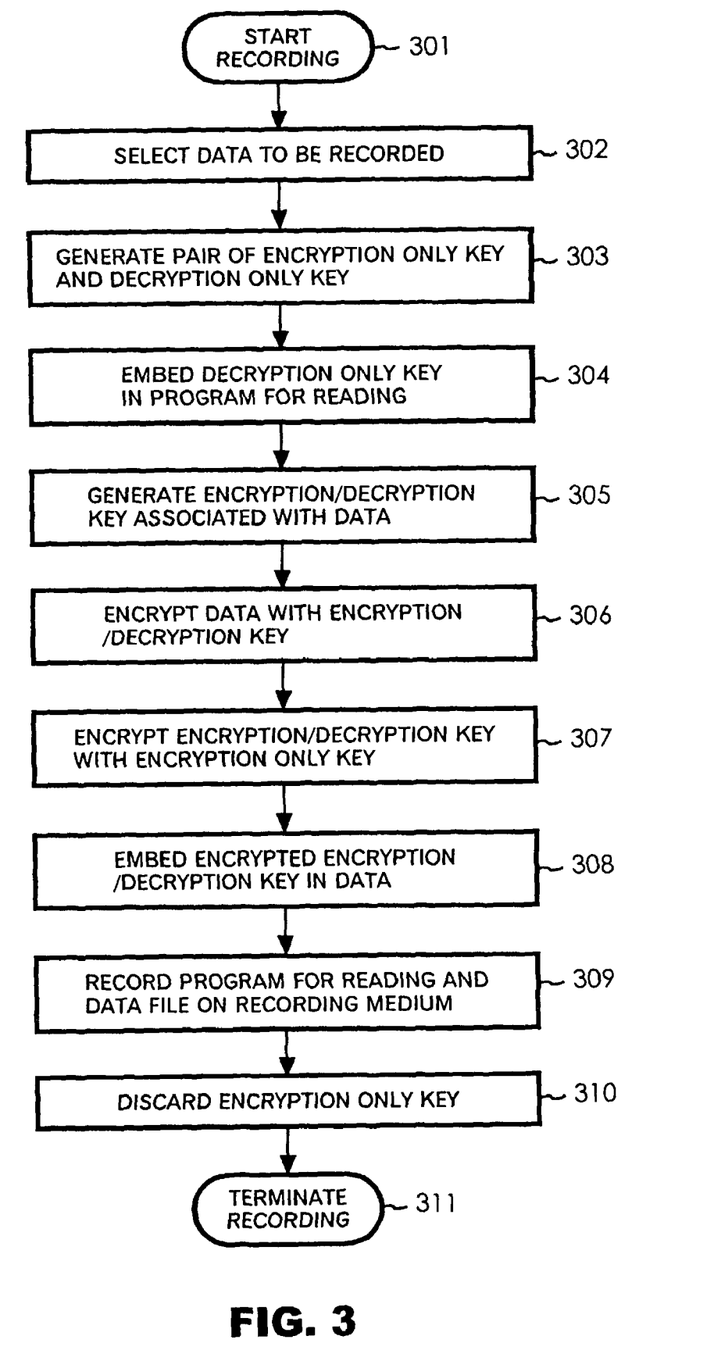
FIG. 3 is a flow chart for explaining a data recording method in an embodiment of the invention.
Figure 4:
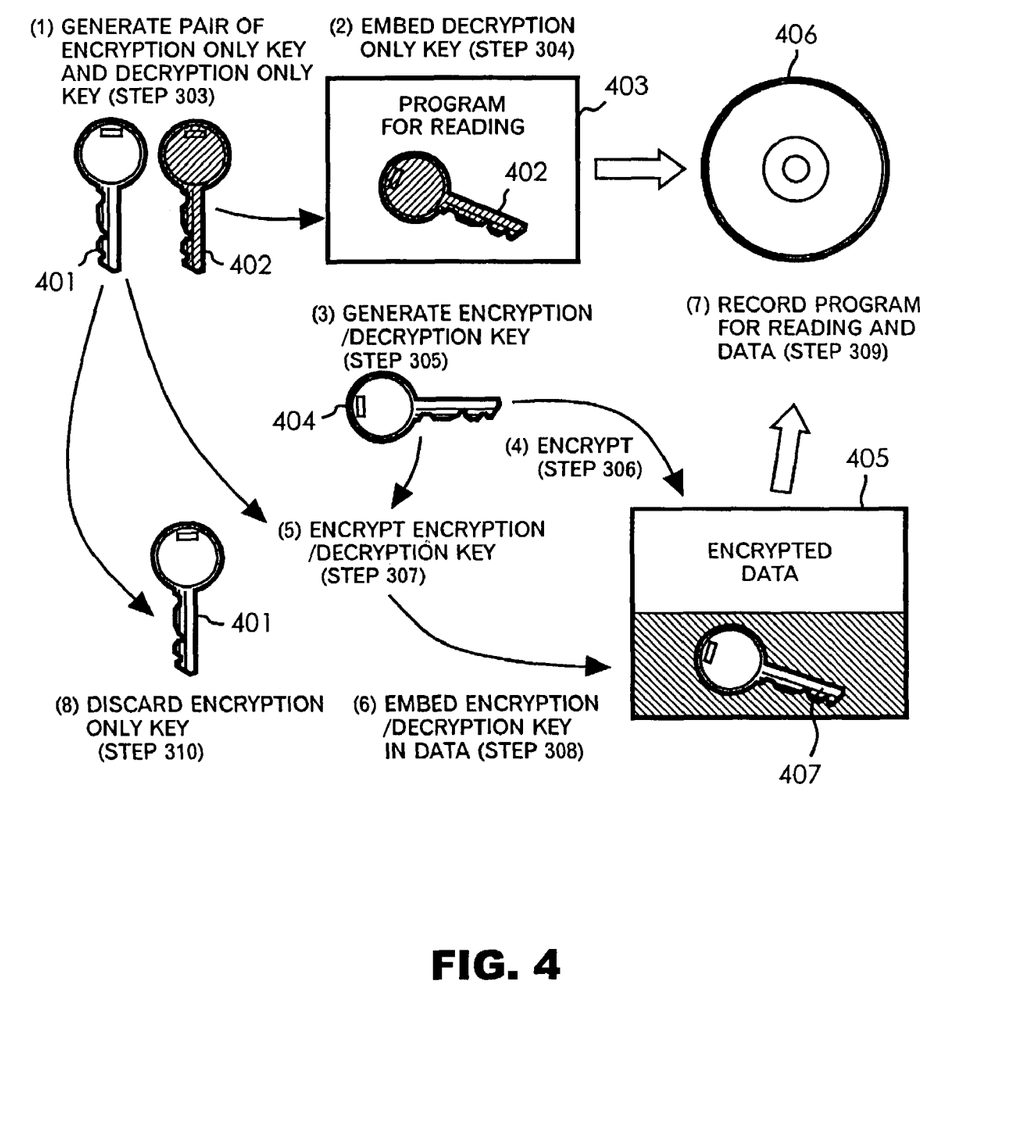
FIG. 4 illustrates the data recording method of the embodiment of the invention.

A description will now be made on a case in which certain data is recorded in a CD-RW along with a program for reading the data, as an example of the present embodiment. FIG. 3 is a flow chart for explaining a data recording method in the embodiment of the invention. FIG. 4 illustrates the data recording method of the embodiment.

In the present embodiment, the program for reading data has a function of editing read data, a function of appropriately retrieving the data, and other functions that are required for ordinary application programs. The program for reading data is preferably written in a programming language such as Java® which operates independently of any particular OS. "Java®" is a trademark or registered trademark of Sun Microsystems, Inc. used in the United States and other countries.

A user first activates the computer 101 shown in FIG. 1. At this time, the database 103 and the CD-RW drive 201 are also activated. The user then loads a CD-RW 406 (see FIG. 4) in the CD-RW drive 201 and operates the computer 101 to activate the program for executing the data recording method described in the present embodiment as an example. At this time, keys recorded in the non-volatile memory 205 of the CD-RW 406 are recognized to activate the program. Thus, only a particular combination of a licensed terminal and a CD-RW drive is permitted to use. The program is thus activated to start a data recording operation (step 301).

When the program is activated, the user operates the computer 101 to select an item of data to be preserved in the CD-RW disk 406 from the database 103 (step 302). When the data to be preserved is selected by the user, the program is executed to generate a decryption-only key 402 that is paired with a encryption-only key 401 (step 303). The paired keys are asymmetric keys and have structures different from each other. Specifically, the encryption-only key 401 is used only for encryption, and decryption of data encrypted with the encryption-only key 401 is performed with the decryption-only key 402 that is paired with the encryption-only key 401. Plural pairs of encryption-only keys 401 and decryption-only keys 402 may be recorded in advance in the program, and they may be appropriately selected. Basically, identical sets of encryption-only keys 401 and decryption-only keys 402 will not be generated or use.

A history of generation of sets of encryption-only keys 401 and decryption-only keys 402 is recorded in the non-volatile memory 205 (see FIG. 2). The number of sets of encryption-only keys 401 and decryption-only keys 402 that have been used is counted later from the record contents in the non-volatile memory 205, which allows a party who is licensed to use the data recording method described in the present embodiment to recognize the number of times data recording has been performed. Therefore, the user is charged properly.

When the encryption-only keys 401 and the decryption-only keys 402 are generated, the decryption-only keys 402 are embedded in the program 403 for reading data (step 304). The decryption-only keys 402 become a part of the program for reading. In order to prevent illegal use, the decryption-only keys 402 are preferably embedded such that the positions of the same in the program are unclear.

An encryption/decryption key 404 associated with the data selected by the user at step 302 is then generated (step 305). The encryption/decryption key 404 is a symmetric encryption key (common encryption key), and this single key allows data to be encrypted and allows the encrypted data to be decrypted. The encryption/decryption key 404 is generated at random for each item of data that is selected.

The user may select plural items of data simultaneously at step 302. In this case, the plural items of data selected simultaneously are treated as a single file, and an encryption/decryption key is generated for the file. Obviously, an encrypting process may be performed on each of the plural items of data.

Then, the data selected by the user at step 302 is encrypted with the encryption/decryption key 404 generated at step 305 (step 306). Further, the encryption/decryption key 404 used at step 306 is encrypted using the encryption-only key 401 generated at step 303 (step 307).

An encryption/decryption key 407 resulting from the encryption at step 307 is then embedded in data 405 that has been encrypted at step 306 (step 308).

The program 403 for reading having the decryption-only key 402 embedded therein is obtained through the above-described steps. The data 405 is also obtained in which the encryption/decryption key 407 encrypted with the encryption-only key 401 is embedded and which has been encrypted with the encryption/decryption key 404.

The program 403 for reading and the data 405 are then recorded in the CD-RW 406 (step 309). At step 309, required data is sent from the computer 101 to the CD-RW drive 201 through the LAN 105 and is received at the input/output section 202. Then, the disk drive section 208 controlled by the disk control section 207 records the program 403 for reading and the data file 405 in the CD-RW 406.

The program 403 for reading has a function of creating a list of data files recorded in the CD-RW 406 to allow the names of the data recorded in the CD-RW 406 to be retrieved later.

Next, the encryption-only key 401 is discarded (step 310). The encryption-only key 401 is discarded by erasing data associated with the encryption-only key 401. This terminates the operation of recording data in the CD-RW 406 (step 311).

Among the above-described operations, what is carried out by the user is the activation of the computer, the activation of the program, the loading of the recording medium, and the selection of data to be recorded. The other operations are automatically performed in accordance with the program.

Figure 5:
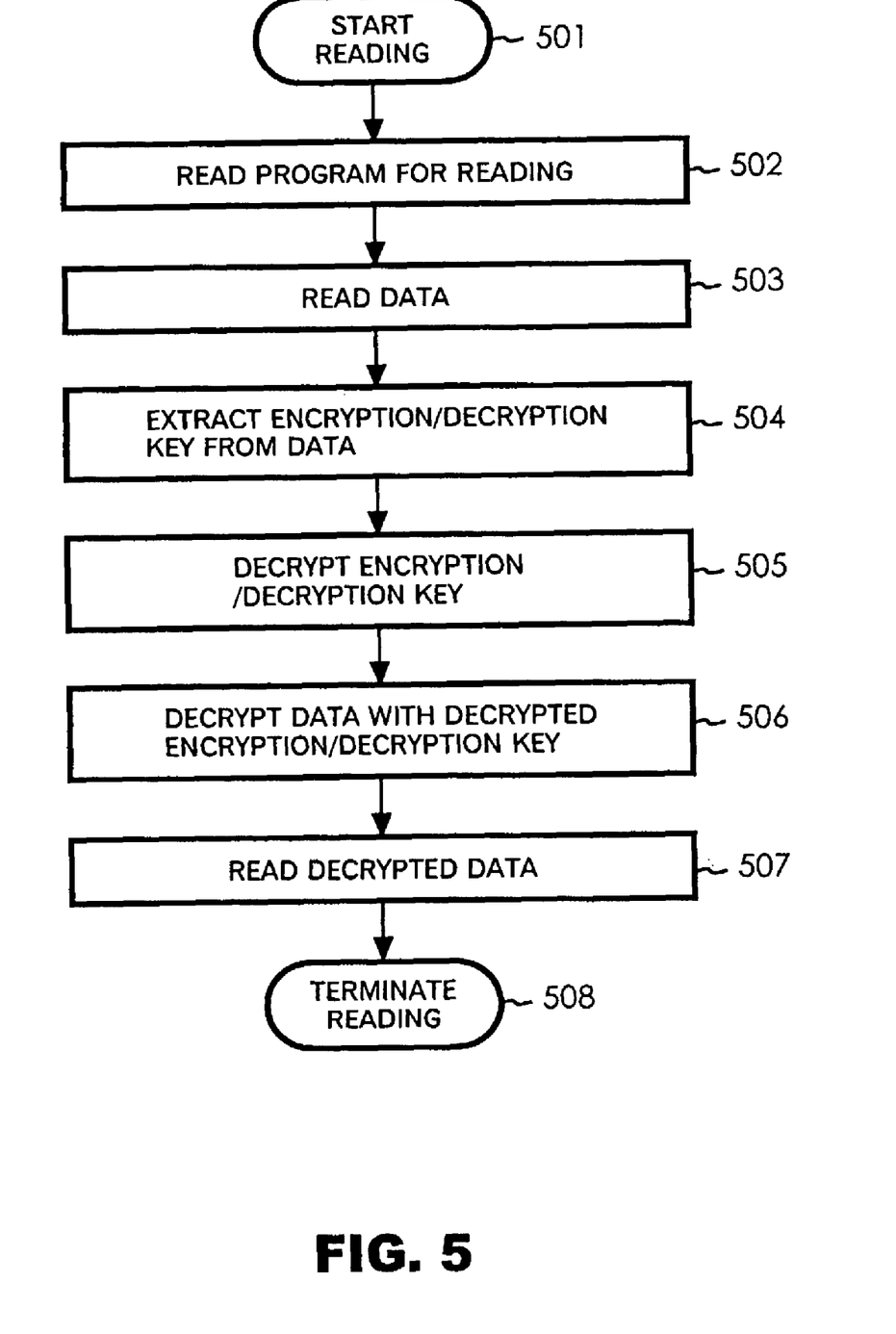
FIG. 5 is a flow chart for explaining a data reading method in the embodiment of the invention.
Figure 6:
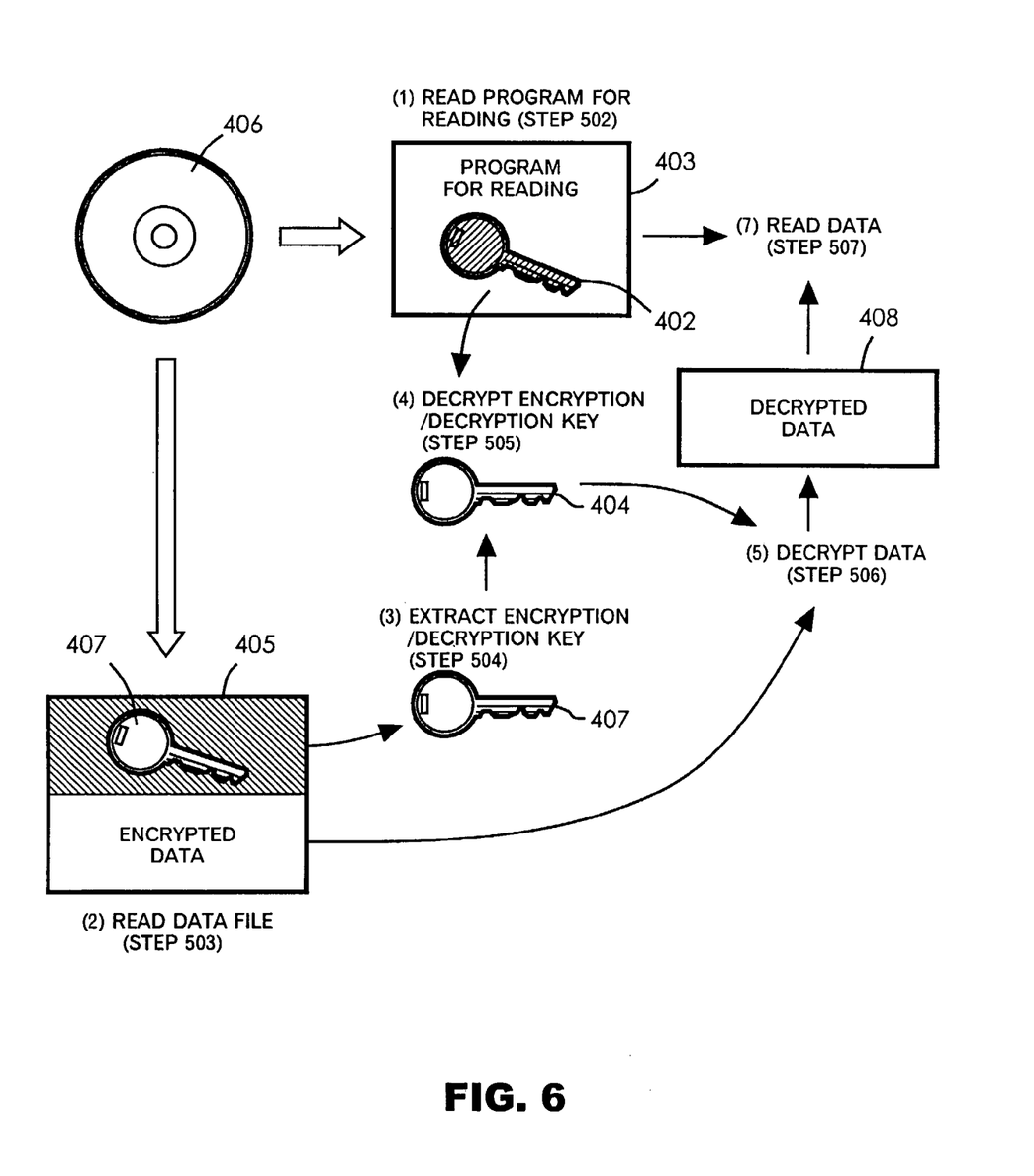
FIG. 6 illustrates the data reading method in the embodiment of the invention.

A description will now be made on a procedure for reading data recorded in the CD-RW 406. FIG. 5 is a flow chart for explaining the reading procedure. FIG. 6 is illustrations for explaining the reading procedure.

In the present embodiment, a computer having hardware in which a CD-RW can be used is required to read data written in a CD-RW 406. For example, a computer is required which has a built-in or external drive adapted to CD-RWs and in which an appropriate OS (operating system) is installed. It is not essential that a program for reading associated with data to be read is installed in the computer. A general-purpose CD-RW drive may be used.

A user starts a reading operation by loading a CD-RW 406 having a data file to be read recorded therein into the CD-RW drive (step 501). When the CD-RW 406 is loaded in the CD-RW drive, a program 403 for reading recorded in the CD-RW drive is automatically read by the computer (step 502), and the program 403 for reading is activated on the computer.

When a plurality of programs for reading are recorded, a list of the names of data files associated with the programs for reading is displayed on a display of the computer. In this case, the user selects a data file to be read from among them. Thereafter, the program for reading associated with the selected data file is read from the CD-RW 406 and is activated on the computer.

The following operation is performed as a result of the execution of the program 403 for reading. First, encrypted data is read from a file 405 (step 503). In this state, the data is encrypted, and the contents can not be recognized using an ordinary method.

Next, an encrypted encryption/decryption key 407 embedded in the data file 405 is acquired (step 504). The encryption/decryption key 407 is also encrypted and can not be used as a key as it is.

When the encrypted encryption/decryption key 407 is acquired, the encrypted encryption/decryption key 407 is decrypted using a decryption-only key 402 embedded in the program 403 for reading to acquire a decrypted encryption/decryption key 404 (step 505).

The encrypted data 405 is then decrypted with the encryption/decryption key 404 decrypted at step 505 (step 506). Thus, decrypted data 408 is acquired (step 507). The decrypted data 408 is read by the function of the program 403 for reading (step 507). The read data is displayed on a display of the computer used by the user as a document or graph. This terminates data reading (step 508).

The program 403 for reading has a function of retrieving, editing, and processing the read data, and the user can perform various operations on the read data.

The above-described steps 501 to 508 are automatically performed according to a program included in the program 403 for reading after the user loads the CD-RW 406 that is a recording medium on the CD-RW drive or performs an activating operation after loading the same.

Since the program 403 for reading is recorded in the CD-RW 406 that is a recording medium, it is not essential that an application program for reading the data has been installed in the computer used for reading the data. Therefore, the data can be read from the recording medium without concern about the type and version of the application program installed in the computer used.

The number of sets of dedicated keys 401 and 402 thus generated is stored in the CD-RW drive 201. Therefore, a party who licenses the present technique can periodically maintain the CD-RW drive 201 and periodically count the number for charging, which makes it possible to license users to use the product on a charged basis.

In the present embodiment, predetermined data recorded in a recording medium is difficult to decrypt without combining it with a program for reading which has been compiled for recording the data and which has been recorded in the recording medium along with the data. That is, the data recorded in the recording medium is difficult to decrypt with a program for reading other than a predetermined combination with the predetermined data recorded in the recording medium because of a mismatch of the key, and it is therefore difficult to read the data from the recording medium. Since it is thus difficult to use a program for reading that has been copied on an illegal basis, illegal copying and use of the same is suppressed.

The present embodiment also suppresses illegal use of a program for copying the contents of a CD-RW 406 in which data has been recorded and recording the data in another recording medium again. For example, let us assume that a third party obtains a CD-RW 406 in which data has been recorded and copies the contents of the same to obtain a program 403 for reading. The program 403 for reading does not include a encryption-only key 401 (see FIG. 4) and does not have a function of generating the encryption-only key 401 and a decryption-only key 402 to be paired with the same. It is therefore difficult for the party to rewrite data 408 read from the disk and to record it in another recording medium. Thus, the program can not be easily used on an illegal basis.

A third party may obtain a recording medium in which encrypted data and a program for reading the data are recorded and may attempt to get a clue to generate a encryption-only key 401 and a decryption-only key 402 from the same. The reason is that data can be freely written in a medium as shown in FIGS. 3 and 4 without paying a license fee if a encryption-only key 401 and a decryption-only key 402 can be freely generated.

However, it is not easy to obtain a encryption-only key 401 from a program for reading recorded in a medium. It is normally difficult to obtain a encryption-only key 401 from a decryption-only key 402 that is a key in an asymmetric relationship with the same. The data writing method described in the present embodiment cannot be carried out without obtaining a encryption-only key 401. It is therefore difficult to carry out the data writing method described in the present embodiment on an illegal basis in the above-described way. That is, it is difficult to reproduce the data recording method described in the present embodiment utilizing a program for reading recorded in a recording medium. Thus, illegal use of the data recording method described in the present embodiment is suppressed.

A party who attempts to carry out the data writing method described in the present embodiment on an illegal basis may find an encrypted encryption/decryption key 407 from data recorded in a medium and try to reproduce the data recording method shown in FIGS. 3 and 4 based on the same.

However, even if an encrypted encryption/decryption key 407 is found in some way, it is difficult to obtain a encryption-only key 401 that is not recorded. Therefore, this approach is also impractical.

It is theoretically possible to decrypt data using a random decrypting technique. However, since each item of data or each recording medium has a different decryption-only key 402 and encryption/decryption key 404, results of such decryption can not be utilized with any benefit.

For the reasons described above, the method of recording data in a recording medium described in the present embodiment can not be carried out without a dedicated CD-RW drive 201. When a dedicated CD-RW drive 201 is used, the utilization of same is recognized by a party who licenses the same. The licensing party can reliably charge a user for the use of a program for executing the data recording method described in the present embodiment.

In addition to the above-described method, the data recording method described in the present embodiment may be licensed according to the following methods. Referring to one of the methods, a business party who licenses the above-described recording method accesses a computer 101 used by a user through the internet at predetermined periods to count the number of sets of encryption-only keys 401 and decryption-only keys 402 that have been generated and recorded in a CD-RW drive 201. An example of the method will be described below in detail.

Figure 7:
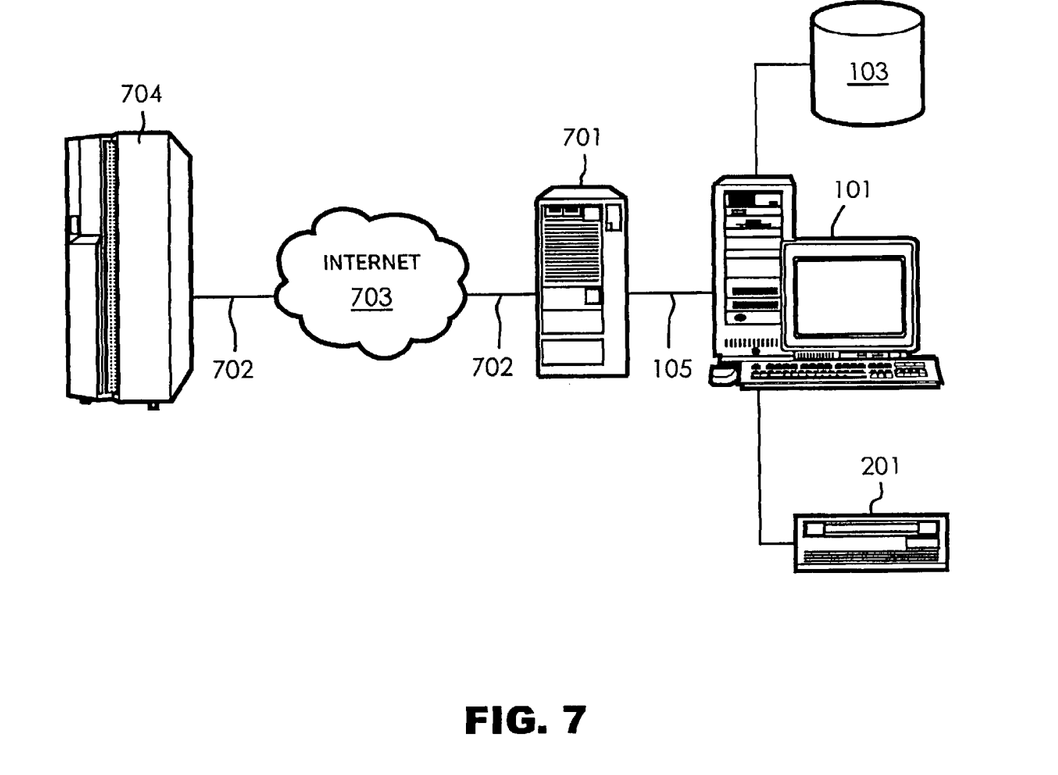
FIG. 7 illustrates a network in which a counting method that is an embodiment of the invention is used.

FIG. 7 illustrates an example of the present embodiment. FIG. 7 shows an example of a network including a computer 101, a database 103, a CD-RW drive 201, an internet server 701, a private line or telephone line 702, an internet 703, and an internet server 704. The internet server 701 has functions to connect a user to the internet 703. While FIG. 7 shows an example in which the computer 101 is connected to the internet server 701 through a LAN 105, a plurality of computers are normally connected to the internet server 701 in practice, and the internet server 701 controls connection of business establishments to the internet 703. The internet server 701 is connected to the internet 703 through a telephone line or private line.

The internet server 704 is a server used by a business party who licenses the data recording method described in the present embodiment. The internet server 704 connects to the internet 703 using the telephone line or private line 702 to access the computer 101 of the user periodically. The internet server 704 counts the number of sets of encryption-only keys 401 and decryption-only keys 402 that have been generated and recorded in the CD-RW drive 201. The business party can recognize a history of use of the user of the present technique from the count to charge the user a license fee based on the same. For example, the business party collects the license fee as a direct debit from an account designated by the user based on the count. While an example in which a business party accesses a user has been described, a configuration is possible in which a user periodically reports the state of use of a licensed technique.

The above-described licensing scheme utilizing the internet may be used for other licenses. For example, the above-described method utilizing the internet may be used in a case in which a licensing business provides a user with a set of a encryption-only key 401 and a decryption-only key 402 on a charged basis through the internet. In this case, sets of encryption-only keys 401 and decryption-only keys 402 generated by the internet server 704 or a computer connected to the internet server 704 are provided to the user on a charged basis through the internet 703. The user purchases and uses the paired keys through the network. In this case, the user obtains a program for recording data in a recording medium in advance and pays a license fee to the business party for the use of the keys.

While the above method of licensing has been described with reference to an example in which the number of sets of encryption-only keys 401 and decryption-only keys 402 is counted to recognize a history of data recording, the number of times data has been written in a recording medium may be directly counted. Further, a business party may charge for the capacity of data recorded in a recording medium. While FIG. 7 shows an example in which the internet server 701 is used by a user, a user is not necessarily required to use an internet server. For example, a configuration is possible in which the computer 101 has a function of connecting to the internet to connect directly to the internet 703.

In the present embodiment, since a key for encrypting and decrypting data (encryption/decryption key 404) is a symmetric encryption key, the speed of data encryption and decryption can be kept at a level at which no problem occurs in practice.

While the invention has been specifically described based on an embodiment of the same, the invention is not limited to the embodiment and may be modified without departing from the teaching of the same.

There is no particular limitation on the type of data to be handled according to the present embodiment. Data to be handled include data associated with taxes which must be preserved for a long time and which requires an application program having special functions, data handled by public offices and other public organizations, academic data, news data (such as contents of newspapers), personal data to be preserved for a long time, and data that has been recorded in microfilms in the past.

A configuration may be employed in which a plurality of programs associated with different operation systems are provided and in which any of the operating systems is appropriately selected at a reading operation.

While a CD-RW has been referred to as an example of a recording medium in the present embodiment, possible media include DVD-RAM (digital versatile disk random access memory), DVD-R (digital versatile disk-recordable), DVD-RW (digital versatile disk-rewritable), magneto-optical disk, magnetic recording tape, hard disk, and solid-state electronic memory.

The present embodiment has no function to protect data contents against access from a third party. That is, anyone can access data written in a CD-RW 406 that is a recording medium by loading the CD-RW 406 in a CD-RW drive (which may be an ordinary general-purpose product) and activating a program 403 for reading recorded therein. Under such circumstances, an existing security technique such as electronic signature may be combined with the technique described in the present embodiment.

The technique described in the present embodiment may be licensed using a method in which a limit is placed on the number of asymmetric keys (the number of sets of keys for encryption and keys for decryption) that a user can use. In this case, a system may be employed in which a user is provided with new sets of asymmetric keys through the internet when the user has used up the predetermined number of asymmetric keys. The technique described in the present embodiment may be licensed using a method in which the use of the technique is limited to a certain period.

In the present embodiment, data may be encrypted with a encryption-only key 401 without using an encryption/decryption key 404, and the encrypted data may be decrypted using a decryption-only key 402. In this case, since asymmetric keys are used for encrypting and decrypting data, the encryption and decryption take a longer time than in the case of use of the encryption/decryption key 404 that is a common key.

According to the present embodiment, a licensed user purchases a program that can carry out the present embodiment, installs the same in a computer that the user uses, and further purchases (or rents) a dedicated drive apparatus (e.g., a dedicated CD-RW drive). The invention is not limited to such a mode of implementation. For example, all programs required for carrying out the invention may be recorded in a recording medium, and a user may purchase the recording medium to use it for recording data to be preserved. In this case, the required programs are read from the recording medium purchased and executed to perform data recording as illustrated in FIGS. 3 and 4. In this example, a limit may be placed in advance on the number of sets of asymmetric keys that a user can use, and a charge associated with the number may be added to the price of the recording medium. The technique according to the invention is thus provided to a user, and the provider can receive a payment accordingly. The programs required for carrying out the invention may be provided to a user through the internet.

As described above, even if the contents of a recording medium in which data and a program for reading are recorded are copied, it is not possible to read data that is out of a particular combination and to record new data using the same, which is advantageous in that illegal use of programs is suppressed.

What is claimed is:

1. A data recording method in a data processing system including a processor, the method comprising:
   the processor encrypting non-key data utilizing a data key to obtain encrypted data;
   the processor encrypting the data key utilizing an encryption-only key;
   the processor discarding the encryption-only key;
   the processor embedding the encrypted data key in the encrypted data;
   the processor embedding a decryption-only key required for decrypting the data key in a program for reading and presenting data such that all data read by the program will be operated upon by the data key decrypted from the encrypted data utilizing the decryption-only key; and
   the processor directing recording of the encrypted data embedded with the encrypted data key and the program embedded with the decryption-only key in a recording medium, wherein the program can only be utilized to read the encrypted data recorded therewith in the recording medium.

2. A data recording method according to claim 1, further comprising the processor recording a history of recording of data in a recording medium.

3. A data recording system comprising:
   a processor;
   data storage coupled to the processor;
   program code stored in the data storage, wherein the program code when executed by the processor causes the processor to:
      encrypt non-key data utilizing a data key to obtain encrypted data;
      encrypt the data key utilizing an encryption-only key;
      discard the encryption-only key;
      embed the encrypted data key in the encrypted data;
      embed a decryption-only key required for decrypting the data key in a program for reading and presenting data such that all data read by the program will be operated upon by the data key decrypted from the encrypted data utilizing the decryption-only key; and
      record the encrypted data embedded with the encrypted data key and the program embedded with the decryption-only key in a recording medium wherein the program can only be utilized to read the encrypted data recorded therewith in the recording medium.

4. A data recording system according to claim 3, wherein the program code further causes the processor to record a history of recording of data in a recording medium.

5. A method of reading data from a recording medium, said method comprising:
   a processor of a data processing system accessing a program from a recording medium having recorded therein the program and encrypted data, wherein the program has embedded therein a decryption-only key, and wherein the encrypted data includes non-key encrypted data having an encrypted data key embedded therein;
   the processor decrypting the data key embedded in the non-key encrypted data using the decryption-only key embedded in the program such that all data read by the program will be operated upon by the data key decrypted from the encrypted data utilizing the decryption-only key;
   the processor decrypting the non-key encrypted data from the recording medium utilizing the decrypted data key to obtain decrypted data; and
   the processor directing presentation of the decrypted data using the program.

6. A data processing system, comprising:
   a processor;
   data storage coupled to the processor;
   program code stored in the data storage, wherein the program code when executed by the processor causes the processor to:
      access a program from a recording medium having recorded therein the program and encrypted data, wherein the program has embedded therein a decryption-only key, and wherein the encrypted data includes non-key encrypted data having an encrypted data key embedded therein; decrypt a data key embedded in the non-key encrypted data using the decryption-only key embedded in the program such that all data read by the program will be operated upon by the data key decrypted from the encrypted data utilizing the decryption-only key;
      decrypt the non-key encrypted data from the recording medium utilizing the decrypted data key to obtain decrypted data; and
      present the decrypted data using the program.

7. A program product, comprising:
   a first recording medium; and
   computer-executable program code recorded within the first recording medium that, when executed by a computer, causes the computer to execute:
      encrypting non-key data utilizing a data key to obtain encrypted data;
      encrypting the data key utilizing an encryption-only key;
      discarding the encryption-only key;
      embedding a decryption-only key required for decrypting the data key in a program for reading and presenting data such that all data read by the program will be operated upon by a data key decrypted from the encrypted data utilizing the decryption-only key; and
      recording the encrypted data embedded with the encrypted data key and the program embedded with the decryption-only key in a second recording medium wherein the program can only be utilized to read the encrypted data recorded therewith in the second recording medium.

8. A program product comprising:
   a first recording medium; and
   computer-executable program code recorded within the first recording medium that, when executed by a computer, causes the computer to execute:
      accessing a program from a second recording medium having recorded therein the program and encrypted data, wherein the program has embedded therein a decryption-only key, and wherein the encrypted data includes non-key encrypted data having an encrypted data key embedded therein;

decrypting the data key embedded in the non-key encrypted data using a decryption-only key embedded in the program such that all data read by the program will be operated upon by the data key decrypted from the encrypted data utilizing the decryption-only key;

decrypting the non-key encrypted data from the second recording medium utilizing the decrypted data key to obtain decrypted data; and presenting the decrypted data using the program within the second recording medium wherein the program can only be utilized to read the encrypted data recorded therewith in the second recording medium.

* * * * *